United States Patent [19]

Johansson

[11] 4,142,148
[45] Feb. 27, 1979

[54] REMOTE TRANSDUCER MONITORING SYSTEM

[75] Inventor: Fritz A. Johansson, Riverside, Calif.

[73] Assignee: Bourns, Inc., Riverside, Calif.

[21] Appl. No.: 795,696

[22] Filed: May 11, 1977

[51] Int. Cl.² .................. G01R 27/08; E21B 47/06; G08C 19/02
[52] U.S. Cl. .................. 324/140 R; 73/152; 324/65 R; 340/18 R
[58] Field of Search .................. 324/140, 51, 1, 10, 324/64, 65 R; 340/18 R; 73/152, 154, 151

[56] References Cited

U.S. PATENT DOCUMENTS

| | | | |
|---|---|---|---|
| 2,371,270 | 3/1945 | Smith | 324/1 |
| 2,428,034 | 9/1947 | Nichols et al. | 324/10 |
| 2,880,389 | 3/1959 | Ferre et al. | 324/1 |
| 3,121,840 | 2/1964 | Lamb | 324/10 X |
| 3,390,323 | 6/1968 | Kisling | 324/10 |
| 3,564,914 | 2/1971 | Desai et al. | 73/152 |
| 3,860,865 | 1/1975 | Stroud et al. | 324/51 |
| 3,902,113 | 8/1975 | Bridges et al. | 324/10 |

Primary Examiner—Gerard R. Strecker
Attorney, Agent, or Firm—Paul H. Ware; William G. Becker

[57] ABSTRACT

A transducer monitoring system facilitating at least two measurements in locations which are difficult to access. Advantages include the capability of making the measurements in remote locations where severe environmental conditions exist. A feature of the invention is in its implementation at these remote locations without requiring additional conductors over the requirements for one-parameter measurements. An additional feature of the invention is the simplicity of the installation required at the difficult-to-access location. An additional significant advantage lies in the elimination of crosstalk, so often a serious problem in remote measurement systems. The invention presents a unique arrangement featuring a simple yet effective transducer configuration having few parts and thus high reliability.

7 Claims, 1 Drawing Figure

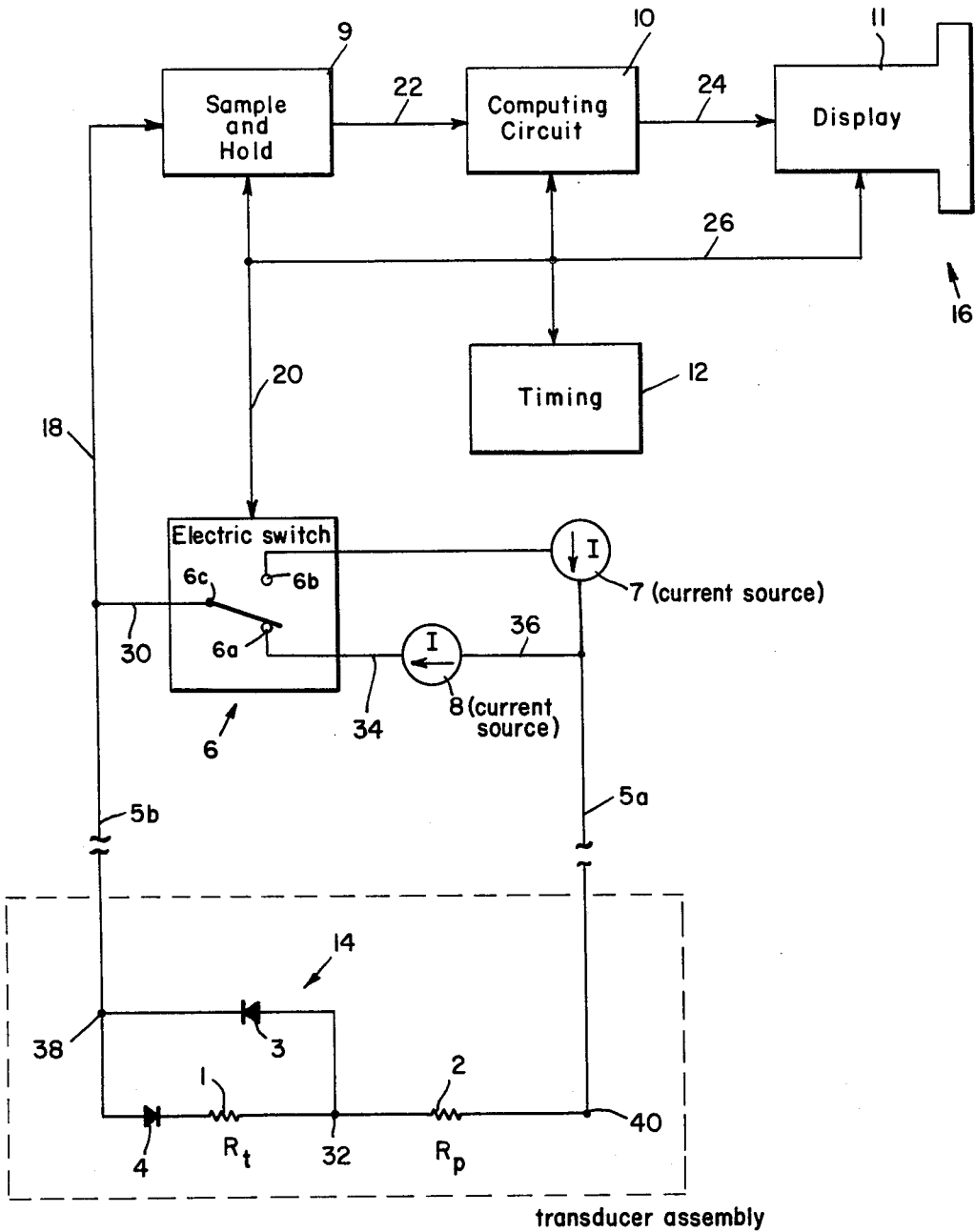

REMOTE TRANSDUCER MONITORING SYSTEM

BACKGROUND OF THE INVENTION

1. Field of the Invention

This invention relates generally to transducer sensor measurement and display systems, and more particularly to such systems for measurements made at difficult to access locations.

2. Description of the Prior Art

Transducer measurement and monitoring systems are known in which a sensor is located in extreme environment, difficult to reach places. One common application of such systems provides for transmission of well logging data from the borehole of a well. Still others provide for the pick-up of seismological data from multiple subterranean locations. These prior art devices vary in complexity from systems utilizing a multiconductor cable, where one conductor of the cable is utilized to transmit one measured parameter and having a complete transmitter located in the borehole, to systems using a monoline cable on a time-shared basis.

While presently available systems can perform the function of remote measurements, some disadvantages of these prior art systems include their complexity, unreliability and tendency to malfunction. Most are pulse coded systems requiring synchronization signals and a relatively large number of active components at the measurement location. Among other things, these systems suffer from the ambiguities caused by cross-talk, noise and pulse overshoot problems. Most of these prior art devices have met special needs as presented by specific problems and have thus served narrow purposes. Some of these prior art devices have been described in the following listed patents that were brought to the attention of the Applicant through a novelty search conducted in the United States Patent and Trademark Office:

1. U.S. Pat. No. 3,725,857 — "Means and Method for Time-Sharing Multichannel Well Logging" — Robert W. Pitts, Jr.
2. U.S. Pat. No. 3,727,179 — "Data Transmission Responsive to Synchronization Signal" — Kenneth A. Bennett
3. U.S. Pat. No. 3,652,979 — "Installation for the Transmission of Multiplexed Seismic Signals" — Philippe Angelle
4. U.S. Pat. No. 3,309,657 — "Dual Channel Well Logging System" — William R. Rabson et al.
5. U.S. Pat. No. 3,122,707 — "Discriminator for Frequency Modulated Seismic Signals" — Josiah J. Godbey It would thus be a great advantage to the art to provide a new and improved information system useful in locations which are difficult to access.

Another great advantage to the art would be the provision of such a system in which there is no cross-talk between measurement channels.

A further desirable advantage to the art would be the provision of such a system requiring only a simple installation at a difficult-to-acess, extreme environment location.

An additional important advantage to the art would be the provision of such a system in a relatively uncomplicated and inexpensive yet reliable package.

SUMMARY OF THE INVENTION

It is an object of the present invention to provide a new and improved dual channel information system useful in locations which are difficult to access and which exhibit extreme environmental conditions.

A further object of this invention is to provide a new and improved dual channel information system wherein information from both channels may be transmitted without requiring any additional conductors in a cable over the requirements for one-parameter transmission.

Another object of the present invention is to provide a new and improved dual channel information system with no cross-talk between channels.

A still further object of this invention is to provide a new and improved dual channel information system requiring only a simple installation at the difficult-to-access location.

An additional object of the present invention is to provide the aforestated objects in a relatively uncomplicated and inexpensive yet reliable system.

In the accomplishment of these and other objects, a transducer monitoring system is provided in which at least two measurements are completed in locations which are difficult to access. This system has the capability of making these measurements in remote locations under extreme environmental conditions. An important feature of the invention is the simplicity of the installation required at the difficult-to-access location. The simple yet effective transducer configuration has high reliability as a result of using very few active parts at the remote, extreme environment location.

Typically the transducer assembly consists of two transducers, commonly a temperature transducer and a pressure transducer, and two diodes. The physical location of the transducer assembly may be in an oil well, for example, several thousand feet below the earth's surface. A communication line connects the transducers with a surface unit. This communication line may be a one-wire line using the earth as a return, or it may be a standard two-wire line, or alternatively it may consist of a three-phase power line which is spliced into at both the surface location and the downhole location. The surface unit typically consists of an electronic switch, current sources, a sample and hold module, a computing module, a display means, and a timing module. In one position of the electronic switch a current is caused to flow in one direction through the transducer assembly. In another position of the electronic switch a current is caused to flow in another direction through the transducer assembly. The results of these two current flows are monitored by the sample and hold module whose output is operated upon by a computing facility and then displayed. The transducer assembly, which due to the simple configuration, is highly reliable, is superior to any existing device.

BRIEF DESCRIPTION OF THE DRAWING

Further advantages and features of the present invention will be more fully apparent to those skilled in the art to which the invention pertains from the ensuing detailed description thereof, regarded in conjunction with the accompanying drawing, in which:

FIG. 1 is a schematic/block diagram helpful in explaining the operation of the invention.

DETAILED DESCRIPTION

Although specific embodiments of the invention will now be described with reference to the drawing, it should be understood that such embodiment is by way of example only and merely illustrative of but a small number of the many possible specific embodiments which can represent applications of the principles of the invention. Various changes and modifications obvious to one skilled in the art to which the invention pertains are deemed to be within the spirt, scope, and contemplation of the invention.

Transducers having elements whose output ratios are dependent upon the value of applied physical phenomena are well-known in the art. For example, a diaphragm in a pressure transducer, subjected to an incident pressure, will cause movement of a potentiometer wiper along its resistance element such that the position of the wiper along that element gives an indication of the magnitude of the incident pressure. A bimetallic element in a temperature transducer, subjected to an incident temperature, will likewise cause movement of potentiometer wiper so as to give an indication of the magnitude of the incident temperature. Such transducers have been used to measure such diverse physical phenomena as light frequency (colorimeters), position (gyroscope pickoffs), acceleration, pressure and temperature to name but a few. The use of general and conventionally well-known transducers are contemplated in the present invention.

Assume that electronic switch 6 is in position 6a where current source 8 is activated through lead 34. It will be assumed that the line resistance $R_L$ is known. Current will then flow from current source 8 through line 34 to electronic switch contact 6a through a line 30 through communication cable 5b and into junction 38 of transducer assembly 14. This current will continue through diode 4 through transducer resistive element 1 whose resistance varies as a function of a physical phenomena, here exemplified as temperature through junction 32 through transducer resistive element 2 whose resistance varies as a function of a physical phenomena, here exemplified as pressure and out through junction 40 and through the other side of communication cable 5a through a line 36 and back into current source 8. Current sources 7 and 8 are capable of providing a known or measurable current value. The voltage $V_1$ now seen by sample and hold circuit 9 by means of a line 18 is given by the relation:

$$V_1 = I(R_L + R_t + R_p) + V_{d4}$$

where $V_d$ is the voltage drop across the diode 4. This voltage $V_1$ will now be sampled and held in sample and hold module 9. If now electronic switch 6 shifts to position 6b, current source 7 will be engaged. Current will now flow through communication cable lead 5a and into junction 40 of the transducer assembly. This current will continue through transducer resistive element 2, whose resistance varies as a function of the same physical phenomena as noted above and through diode 3, and out of junction 38 through communications cable line 5b, through lead 30 back through switch contact 6c into switch contact 6b and through lead 28 back into current source 7. It will be noted that this current does not flow through transducer resistive element 1 because of the back bias of diode 4. The voltage as sensed by sample and hold module 9 at lead 18 is now $V_2$ where $V_2$ is equal to:

$$-I(R_L + R_p) - V_{d3}$$

This voltage is also sampled and held in module 9. Computing module 10 receives data from sample and hold module 9 by means of a lead 22. Computing module 10 now adds $V_1$ and $V_2$ obtaining:

$$V_1 + V_2 = IR_L + IR_t + IR_p + V_d - IR_L - IR_p - V_d$$

Since $V_{d3}$ is equal to $V_{d4}$, the numerical subscripts can, and therefore have been, dropped. Thus, $$V_1 + V_2 = IR_t$$

The resistance of transducer $R_t$ being known since $R_t = (V_1 + V_2)/I$, it is possible to transform the resistance value directly to a temperature value because resistance is a direct function of temperature in the transducer which is measuring the physical phenomena. The temperature T is now known and may be supplied to display unit 11 by means of lead 24 from computing circuit 10. Since in addition to the temperature, the current I is also known, the voltage across the diode $V_d$ is also known. The computing module 10 can now substitute the values for $V_d$ and $R_L$ in the equation for $V_2$ to solve for $R_p$. Both pressure and temperature, since they are now known, may be processed in computing circuit 10 and presented to display module 11 by means of a cable lead 24. Timing module 12 communicates with display module 11, computing circuit 10, sample and hold module 9, and the electronic switch 6 by means of cables 20 and 26 interconnected as shown in the figure. The timing module 12 thus controls switching, sampling, and display, and so forth. The surface unit denoted generally by numeral 16 usually will contain all the components such as electronic switch 6, current sources 7 and 8, sample and hold module 9, computing circuit 10, display means 11, and timing and control module 12.

In locations such as oil wells, it is very expensive to add additional wires for transducer monitoring, and also due to severe environment temperatures of approximately 200° C., it is extremely important that the transducer assembly complexity be kept to a minimum. Mechanical switching devices such as relays should not be used in the downhole locations and neither should devices such as transistors or operational amplifiers for maximum reliability. A feature of the present invention is its removal of all complexity from the transducer assembly to the surface unit where environmental conditions and accessibility are less extreme.

Thus, there has been described a transducer monitoring system that will find use in locations which are difficult to access and which exhibit extreme environmental conditions. Great improvements in reliability, flexibility, maintainability, ease of operation and so forth have been provided through the novel advantages of the invention.

It is pointed out that although the present invention has been shown and described with reference to particular embodiment, nevertheless various changes and modifications obvious to one skilled in the art to which the invention pertains are deemed to lie within the purview of the invention.

What is claimed and desired to be secured by Letters Patent of the United States is:

1. A system for monitoring physical phenomena comprising:
    a transducer assembly means comprising at least two diodes and at least two transducer elements, each of said transducer elements varying in resistance as a measurement of change of said physical phenomena, one of said diodes being connected in series with said transducers, and the other said diode being of opposing polarity to said one of said diodes connected in series with one of said transducers, opposite poles of said diodes having common junction point;
    means for initiating first and second current flows in said transducer assembly;
    means for measuring voltages resulting from said first and second current flows respectively;
    means for storing said measured voltages;
    means for transforming said voltage measurements to a determined measurement of said physical phenomena; and
    means for displaying said measured and determined physical phenomena change for monitoring the same.

2. The system as described in claim 1, wherein said means for initiating said first and second current flows in said transducer assembly includes at least two current sources.

3. The system of claim 2, wherein said at least two current sources are connected to said transducer assembly by means of an electronic switch and a communications cable.

4. The system as described in claim 1, wherein said means for measuring voltages resulting from said first and second current flows comprises:
    a sample and hold circuit responsive to signal output from said transducer assembly;
    a computing circuit responsive to and operating upon signal content supplied by said sample and hold circuit;
    display means responsive to signal output from said computing circuit and effective to display measured and derived parameters from said transducer assembly; and
    timing means for coordinating the processing of signals of all elements of said means for measuring voltages resulting from said first and second current flows.

5. A system for monitoring physical phenomena comprising:
    a transducer assembly means comprising at least two diodes and at least two transducer elements, each of said transducer elements varying resistance as a measurement of change of said physical phenomena, one of said diodes being connected in series with said transducers, and the other said diode being of opposing polarity to said one of said diodes connected in series with one of said transducers, opposite poles of said diodes having common junction point;
    at least two current sources connected to said transducer assembly by means of a communciation cable;
    an electronic switch connected to said current sources and said transducer assembly by means of said communications cable controlling the current flow therethrough; and
    means for processing observed voltages resulting from current flow through said transducer assembly means to monitor said physical phenomena.

6. The system as described in claim 5, wherein said means for processing observed voltages includes:
    a sample and hold circuit connected to said electronic switch and said communications cable;
    a computing circuit responsive to data output from said sample and hold circuit;
    display means responsive to signal output from the computing circuit; and
    timing means for coordinating the signal processing of all system elements.

7. A method of monitoring a physical phenomena by measuring at least two voltages comprising the steps of:
    forcing a first current flow in a first one of two directions through a transducer assembly means comprising at least two diodes and at least two transducer elements, each of said transducer elements varying in resistance as a measurement of change of a physical phenomena, one of said diodes being connected in series with said transducers, and the other said diode being of opposing polarity to said one of said diodes connected in series with one of said transducers, opposite poles of said diodes having common junction point;
    measuring, recording and storing a first voltage value resulting from said first current flow;
    forcing a second electric current flow in the other end of two directions through said transducer assembly means;
    measuring, recording and storing a second voltage value resulting from said second current flow.
    said voltages representative of said physical phenomena.

* * * * *

UNITED STATES PATENT OFFICE
CERTIFICATE OF CORRECTION

Patent No. 4,142,148    Dated February 27, 1979

Inventor(s) Fritz A. Johansson

It is certified that error appears in the above-identified patent and that said Letters Patent are hereby corrected as shown below:

Column 1, Line 64:   "acess" should read -- access --

Column 6, Line 47:   "end" should read -- one --

Signed and Sealed this

Eleventh Day of September 1979

[SEAL]

Attest:

Attesting Officer

LUTRELLE F. PARKER
*Acting Commissioner of Patents and Trademarks*